June 14, 1932. C. E. SUMMERS 1,862,723
V-TYPE ENGINE
Filed Oct. 7, 1929 5 Sheets-Sheet 1

Fig.1.

Inventor
Caleb E. Summers
By Blackmore, Spencer & Flick
Attorneys

Patented June 14, 1932

1,862,723

UNITED STATES PATENT OFFICE

CALEB E. SUMMERS, OF PONTIAC, MICHIGAN, ASSIGNOR TO GENERAL MOTORS CORPORATION, OF DETROIT, MICHIGAN, A CORPORATION OF DELAWARE

V-TYPE ENGINE

Application filed October 7, 1929. Serial No. 397,859.

This invention has to do with internal combustion engines such as are used on automobiles and particularly with multicylinder engines having their cylinders angularly disposed, of which the V-eight is the best known commercial example.

While engines of this description have been very widely used on larger and more expensive motor vehicles they have not found application on small light cars largely because of their great size. As heretofore designed, in order to get power V-eight engines have been marked by relatively long stroke and narrow bore and owing to the cylinder arrangement this has resulted in greatly increasing its over-all width. It has also been the practice, in the interest of compactness and economy, to design the engine with various adjuncts such as the intake manifold, carburetor and the like in the angle of the V and to provide room for these parts and render them accessible it was necessary to have considerable space between the banks of cylinders. All of these considerations resulted in the production of engines of much greater width than engines having their cylinders in line. Large hood compartments were required to receive them. Hence the engines were not adapted to the lighter class of cars.

I have disclosed in this application a new type of engine having its cylinders arranged in V form and characterized by small overall dimensions, by simplicity and compactness, accessibility, and freedom from vibration.

Various novel features and their importance can best be understood by first stating the considerations that led to my final design. It was essential that the engine be small and compact so that it would fit under the hood of the usual small light automobile. To make the engine narrow it is necessary to have short cylinder blocks, and hence a short stroke. To get the necessary power with a short stroke, it is necessary to use a cylinder of big bore. Employing a big bore and short stroke results in making the V very shallow so that there is but little room in the angle for the usual manifolds and their adjuncts. After long study, I have developed a manifold arrangement which functions admirably in the confined space provided and in addition, gives advantages not obtainable in previous constructions.

The arrangement consists in the case of the intake manifold of arranging it in a form to closely fit the V and providing a down draft carburetor for supplying combustible mixture to it so that the carburetor will be accessible for adjustment. With the intake manifold, may if desired, be combined the usual exhaust manifold. In addition, I have preferably incorporated a water distributor with the manifolds, the distributor taking the water discharged from the pump and directing it to the engine blocks. While I have illustrated a construction in which both manifolds and the water distributing passages are closely associated, it is obvious that in some cases, it may be desirable to make separate provision for one or the other of the manifolds, or for the distribution of water to the blocks. However, in my preferred form the manifolds and distributor are formed in a single casting which fits between the banks of cylinders in a manner suggestive of a keystone.

Besides making for compactness this unitary construction eliminates unsightly and more or less crude piping and other projections above the engine and greatly enhances the appearance and neatness of the job, lessens manufacturing costs and promotes the ease of assembly and disassembly. The carburetor which is preferably of the down draft duplex type can be mounted directly on the keystone so as to be removable therewith.

The closeness of the intake and exhaust manifolds makes it a simple matter to control the heating of the intake mixture. Instead of diverting the exhaust gases about the mixture as is often done, I divert the mixture about the exhaust jacket at slightly opened throttle. On full open throttle the mixture goes straight to the cylinders. This provides a quicker response to adjustment than where exhaust gases must be diverted.

The water distributor is designed to receive water from the discharge side of the pump and direct it to points in the blocks adjacent the exhaust valve seats. It is here that cooling is needed most because of the very high temperatures and their injurious effect on the exhaust valves, and it is one of the great advantages of my arrangement that the coolest water is directed to the points where cooling is needed most.

My keystone also affords maximum accessibility to the valve gear. Following conventional practice, my valve mechanism is arranged in the angle of the V. With conventional engines to adjust the valves it is necessary to work with tools in the confined space within the V beneath the manifolds; and there is great danger of being badly burned by contact with the hot exhaust pipes and other engine parts. I have heretofore proposed to employ hydraulic mechanism in the valve gear to do away with the noise resulting from valve lash and to eliminate adjustment. One form of such mechanism is described and claimed in my Patent No. 1,784,767, Dec. 9, 1930, and the use of valve-operating mechanism of this sort will make it unnecessary to remove the keystone casting, except at rare intervals. However, at such times when access must be had to the valve gearing, the manifolds and distributor unit can be readily detached and moved out of the way to afford an unobstructed working space.

Since the cylinder blocks are formed integral with the crankcase, the space between the blocks in which the valve gear is located may open into the crankcase, thereby aiding in the reduction of lubricating problems. The keystone, therefore, serves as a closure for the upper part of the crankcase and in addition it also serves to tie or connect the upper portions of the two blocks together and reinforce one from the other and make for great strength and ruggedness.

A preferred but not necessarily the only embodiment of the invention is illustrated in the accompanying drawings wherein.

Referring to the drawings the numeral 1 indicates an engine crankcase having at its bottom an oil pan 2 preferably removably secured thereto as by means of attachment bolts or studs 3, and also having integrally formed thereon a flywheel housing 4 and a pair of spaced water-jacketed cylinder blocks 5 and 6 shown as having four cylinders each and disposed in divergent or V relation or at an angle of substantially 90° relative to each other. The jackets for the flow of water or other cooling medium in the blocks 5 and 6 are indicated at 7 and 8 respectively, and these are in communication in the usual manner with the jackets or chambers 9 and 10 of the hollow heads 11 and 12 shown as being removably secured over the tops of the blocks 5 and 6. Above each cylinder the heads are recessed to provide a combustion chamber 13 and provided with a spark plug 14. Within each cylinder is a reciprocable piston 15 connected as by a rod 16 to a crankshaft 17 mounted in suitable bearings in the crankcase.

Figure 1:
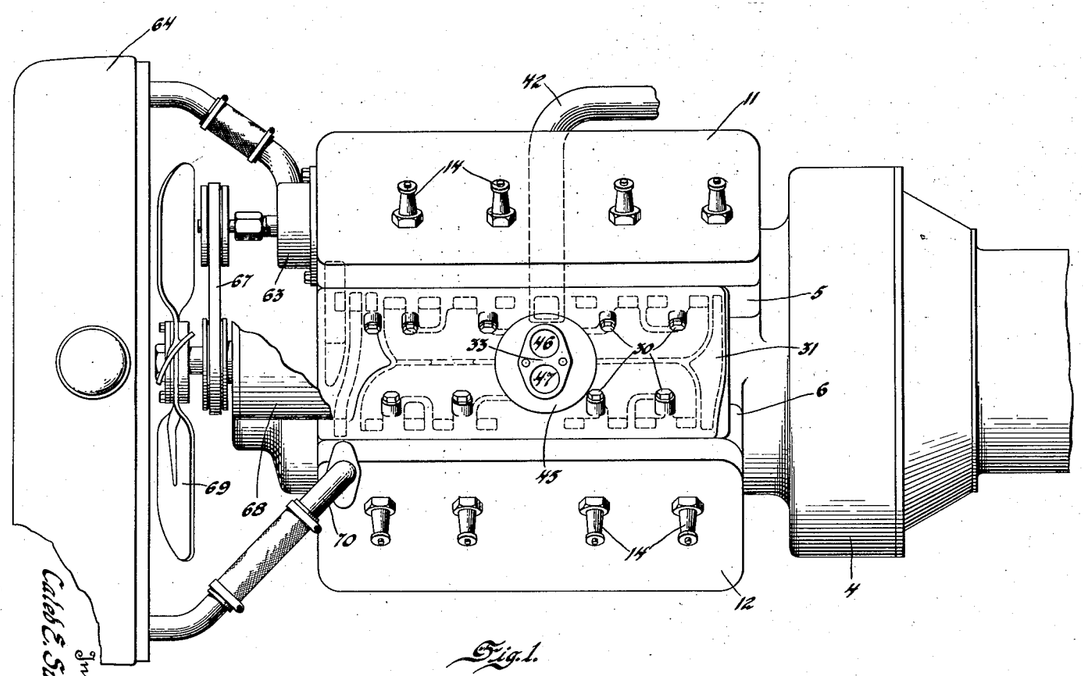
Fig. 1 is a top plan view of an internal combustion engine made in accordance with the invention.
Figure 2:
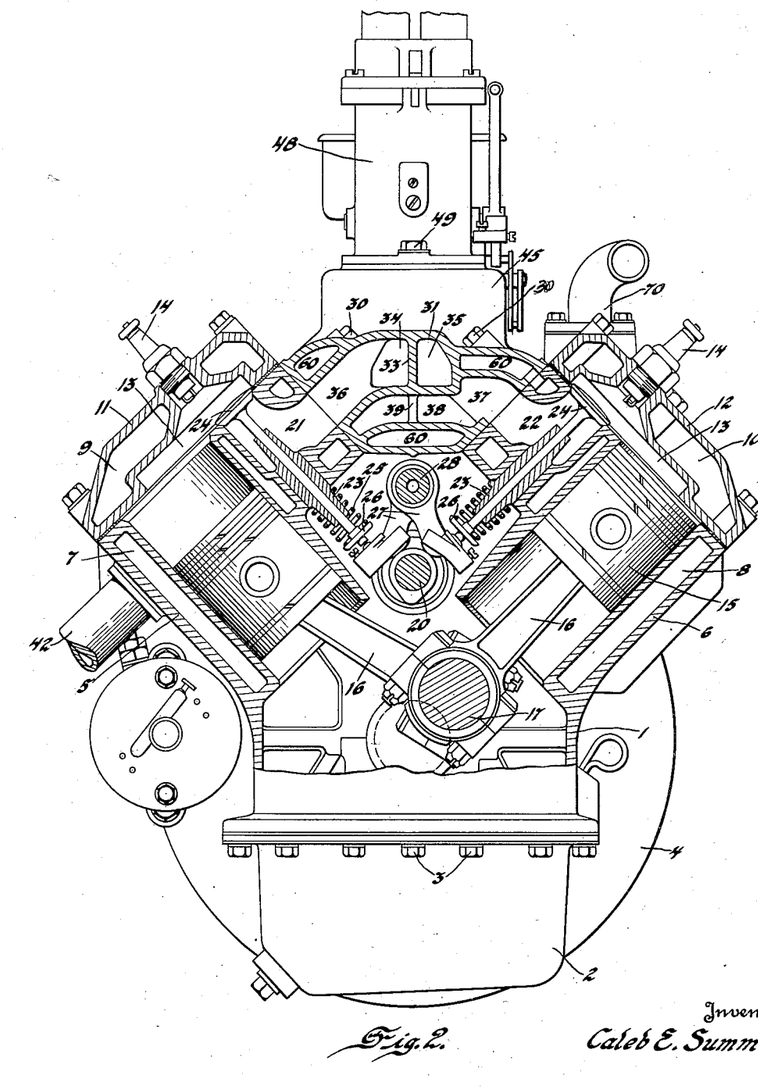
Fig. 2 is a transverse sectional view of the engine.
Figures 3, 10:
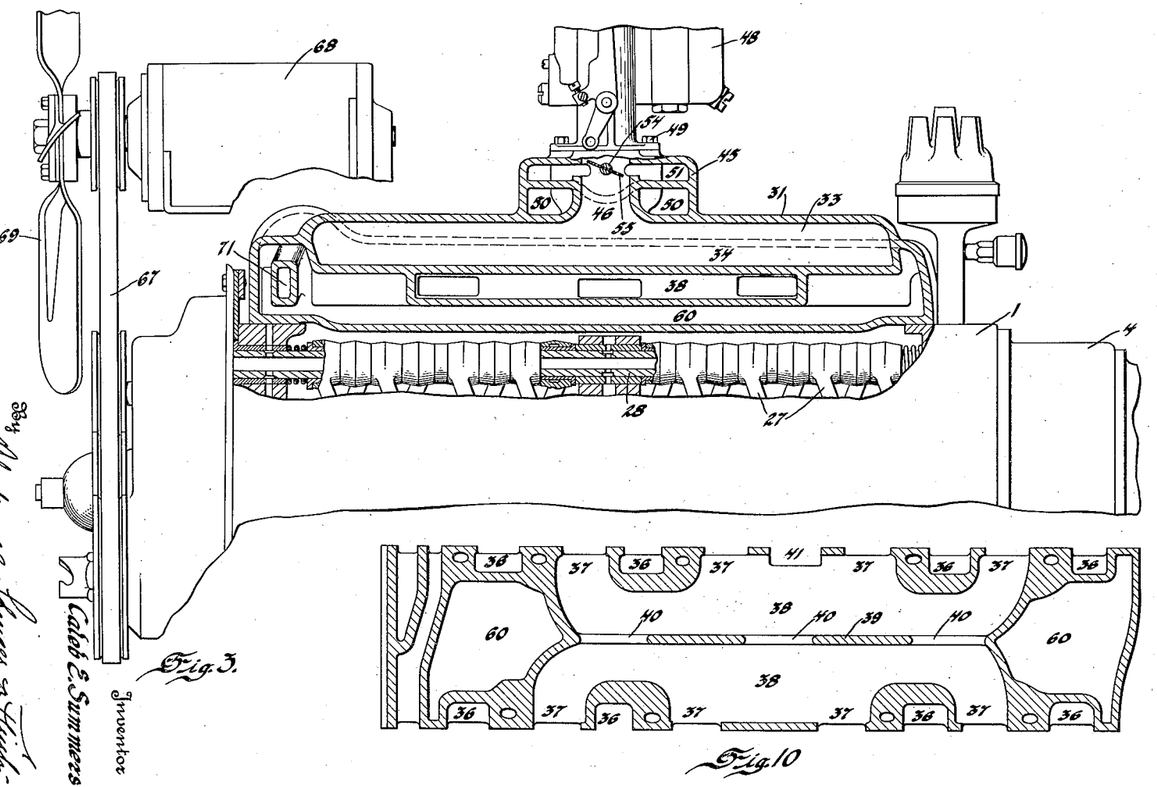
Fig. 3 is a framentary side elevation with parts shown in section.
Fig. 10 is a horizontal sectional view taken on line 10—10 of Fig. 7.
Figure 4:
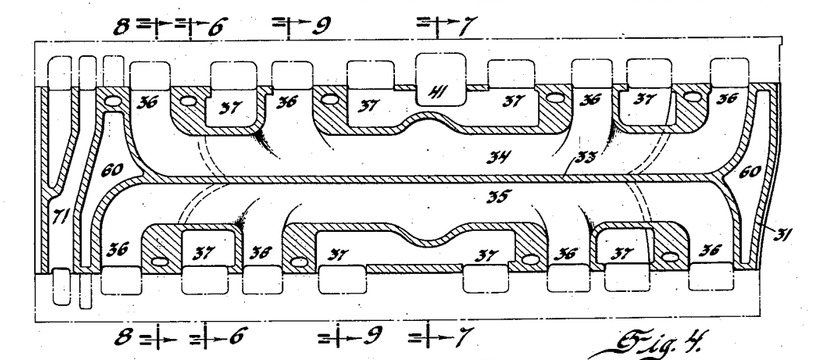
Fig. 4 is a horizontal sectional view of the keystone casting and is taken on line 4—4 of Fig. 6.
Figure 5:
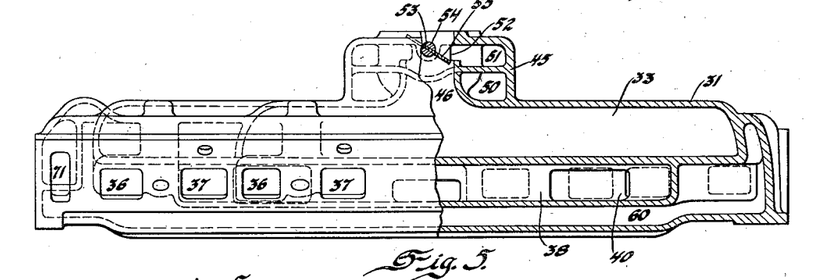
Fig. 5 is a view of the keystone partly in side elevation and partly in section, the section being taken on line 5—5 of Fig. 6.
Figure 6:
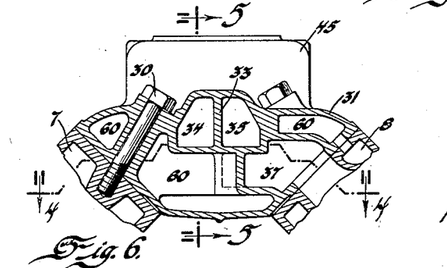
Figs. 6, 7, 8 and 9 are transverse sectional views taken respectively on lines 6—6, 7—7, 8—8 and 9—9 of Fig. 4.
Figure 7:
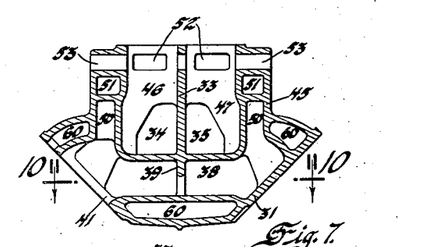
Figure 8:
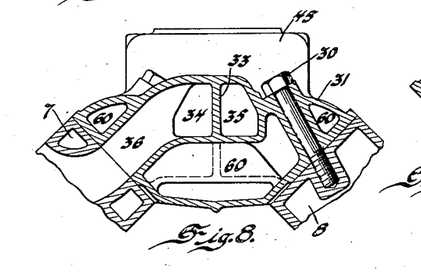
Figure 9:
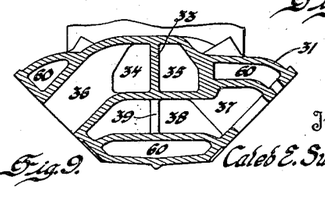

Driven off the crankshaft 17 through gears or the like, is a camshaft 20 located within the crankcase space between the two blocks for operating the valve mechanism associated with the cylinders of both blocks, each cylinder having an inlet valve and an outlet valve controlling ports on the inside portion of the block or that portion adjacent the central space between the blocks. In Fig. 2 of the drawings 21 indicates an intake port and 22 an exhaust port, each of which is substantially rectangular and bends or curves around opening through the top and side surfaces of the block. Extending through the wall of each port is a sleeve or guide 23 for the stem of a poppet valve 24, the head of which seats over the opening at the top surface. To yieldingly hold the valve on its seat, there is provided a coil spring 25 which bears against a suitable washer or retainer 26 carried at the lower end of the valve stem. For each valve there may be provided a rocket arm 27 engageable with one of the cams on the shaft 20 and loosely mounted on a stationary hollow shaft 28 in the crankcase space between the blocks and above the camshaft 20 and which may embody the hydraulic back lash mechanism previously referred to as forming the subject matter of pending application Serial No. 301,764. As will be apparent the rotation of the camshaft 20 in timed relation with the crankshaft rotation actuates the valves in proper predetermined sequence for the admission of fuel and disposal of spent gases at each cylinder.

The hollow shaft 28 is preferably connected with and forms a part of the engine lubricating system, so as to supply oil to the hydraulic valve gear and the various bearing surfaces of associated parts. These bearing surfaces being directly in the crankcase will also be lubricated by the mist and splash of crankcase oil during engine rotation.

Closing the open top of the crankcase above the valve mechanism and extending from block to block and removably secured in place as by bolts or studs 30 is a cover member 31 preferably of cast metal and hollow or provided with cored passages and shaped somewhat in the form of a keystone with inclined sides to fit against the angularly disposed adjacent sides of the two blocks. In addition to closing the crankcase, the keystone casting 31 reinforces and ties the two blocks together and adds material strength to the engine as a whole. By providing it with a series of cored passages, use can be made of the keystone casting as a compact unitary device for the transmission of both combustible and spent gases in place of the usual clumsy intake and exhaust manifolds with their unsightly piping and branch conduits leading separately to and from the individual intake and exhaust ports of the two cylinder blocks and projecting upwardly above the top of the engine. The keystone can likewise be employed for distributing cooling fluid to the water jackets of the two blocks in a manner to direct or send the fluid when it is coolest to the hottest parts, so as to secure more uniform operating temperature throughout the engine and the proper absorption of the heat of combustion to prevent preignition, engine knock, warping and distortion of the valves and the like.

Accordingly, the keystone may be formed as shown in the drawings wherein a series of walls or partitions divide the interior into a number of passages. The upper portion is divided by a central wall 33 into two separate and distinct intake conduits or manifolds 34 and 35, one for each bank of cylinders and each having at certain intervals lateral branches as at 36 for alignment with the inlet ports 21 in a cylinder block. The provision of separate intake manifolds for each cylinder block insures a better distribution of the fuel mixture to individual cylinders. Separate exhaust manifolds, however, are not necessary and several exhaust ports 22 in the two banks of cylinders may each communicate through a lateral branch 37 with the single exhaust passage 38, the central wall 39 being merely for reinforcement purposes and having a series of openings 40 to place opposite sides thereof in communication. The products of combustion leave the exhaust manifold through an opening 41 in the side wall of the keystone which is in alignment with an exhaust pipe 42 extending laterally through the cylinder block 5 from which they are discharged to atmosphere, preferably passing first through a muffler.

At a convenient point the keystone is provided with a raised boss or enlargement 45 through which extend vertical passages 46 and 47 leading to the intake manifolds 34 and 35 respectively from the carburetor 48, secured as by bolts 49 on the top of the boss 45. Within the boss and surrounding the two passages 46 and 47 is a chamber 50 opening into the exhaust passageway and a pair of substantially semi-circular chambers or passages 51—51 associated one with each passage 46—47 and communicating therewith through oppositely disposed openings or holes 52, one of which is at each end of each passage 51. Pivotally mounted in bearings 53 in the boss 45 is a shaft 54 which carries a butterfly valve or deflector vane 55 in each passage 46—47 adjacent the openings 52 and which is preferably connected in suitable fashion with the throttle valve of the carburetor or its actuating parts for operation therewith. The purpose of this is to deflect the fuel mixture from the carburetor through one opening around the semi-circular passageway and out the other opening beyond the deflector vane into the intake manifold. Such deflection increases the path of travel of the gas and sends it through a chamber which is thoroughly heated by the exhaust gases in the adjoining chamber 50. The connection between the throttle valve and deflector shaft is such that the incoming gases are sent through the heating chamber only at slightly open throttle. At higher engine speeds when the throttle is more nearly open, deflection ceases and the gases by-pass the chamber and enter directly into the intake manifold. With this unitary arrangement of intake and exhaust manifolds, it will be apparent that the incoming fuel mixture is heated and conditioned by the hot exhaust gases for proper combustion and the condensation and entrapment of fuel vapors in the intake manifold which is often the cause of engine loading is avoided.

Figure 11:
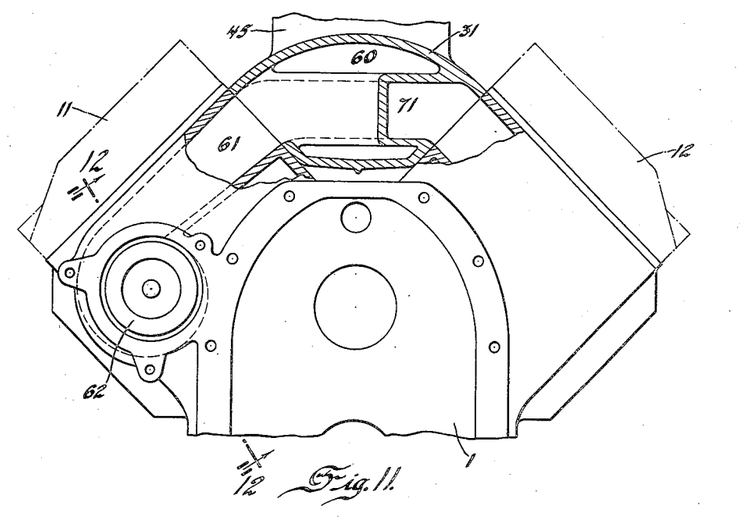
Fig. 11 is a fragmentary front elevation of the engine with parts broken away and Fig. 12 is a section on line 12—12 of Fig. 11.
Figure 12:
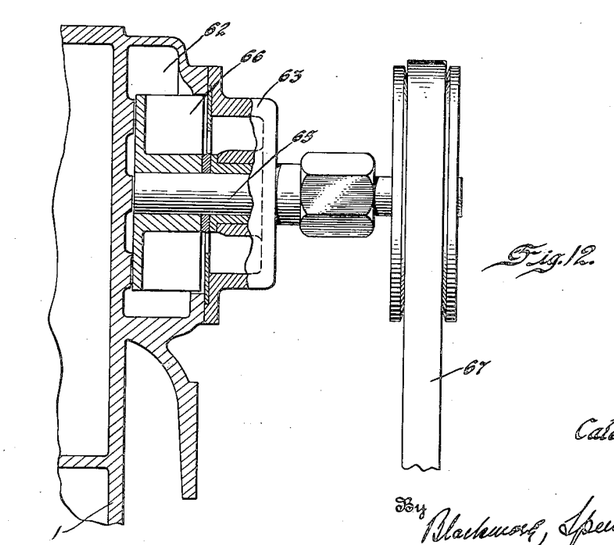

To prevent overheating and secure good distribution of the cooling medium to maintain substantially uniform temperature throughout the various portions of the engine, use may also be made of the keystone as a part of the engine cooling system. To this end the maze of manifold passages in the keystone may be partly surrounded by a chamber or space 60 for the flow of water or other cooling medium. This water space extends below the manifolds and around the several intake and exhaust branches or ports 36 and 37. At its forward end it communicates through an opening in the side wall of the keystone with the tangential duct 61 leading from a water pump chamber 62 which is shown as being formed as an integral part of the cylinder block 5 (see particularly Figs. 11 and 12). A removable cover or domed cap 63 closes the front of the pump chamber and has a lateral neck or extension for connection in a conventional manner with the outlet header or tank of the cooling radiator 64. The cover or dome 63 also provides a mounting for the shaft 65 carrying the pump rotor 66 driven from an engine shaft as by means of a pulley belt 67, which may also drive the generator 68 and radiator fan 69. Thus the cooling water from the radiator is forced under pump pressure into the water chamber 60 of the keystone through which it flows around the manifolds and then into the jackets 7 and 8 of the two blocks entering the jackets through aligned openings in adjacent walls of the keystone and block immediately adjacent the exhaust ports and around the exhaust valve of each cylinder. The exhaust valves and adjacent portions being the hottest parts of the engine, it will be seen that this arrangement distributes and delivers the coolest water to the points of greatest heat and where cooling is needed most.

The water entering the block 6 circulates through the jacket and hollow head leaving through the outlet fitting 70 which is connected to the inlet header or tank of the radiator 64. Water supplied to the block 5 may be returned to the radiator in a similar manner, but in order to simplify the structure and reduce the number of necessary parts it is proposed to send all the water to the radiator through the same outlet, and for the purpose there may be formed in the keystone a cored passage 71 which projects through the water space 60 from side to side in alignment with openings in the adjacent inclined side walls of the two blocks to place the two jackets in communication, so that water from the block 5 flows across the keystone to the block 6 and back to the radiator through the outlet fitting 70.

I claim:

1. An internal combustion engine, including a crankcase and a pair of spaced divergently disposed cylinder blocks integral with the crankcase, and a cover removably secured to the blocks to completely close the open space therebetween above the crankcase, said cover having passages therein in communication with corresponding passages in the two blocks.

2. An internal combustion engine, including a crankcase, a pair of spaced divergently disposed cylinder blocks each having a passage for fluid flow, and a connection between the blocks to reinforce one from the other and close the open crankcase space therebetween, said connection also having a passage therein for communication with the fluid flow passages of the blocks.

3. An internal combustion engine, including an integral crankcase and a pair of spaced divergently disposed cylinder blocks having passages therein, valve-operating mechanism in the crankcase between the blocks for controlling said passages, and a hollow closure member for the crankcase removably fastened to the blocks over the valve-operating mechanism and with its hollow space in communication with said passages.

4. An internal combustion engine, including an integral crankcase and a pair of spaced divergently disposed cylinder blocks having inlet and outlet ports, valve devices in the respective blocks at sides adjacent the open space therebetween for controlling said ports, operating means common to the valve devices of both blocks located in said space, and a member connecting the blocks and closing the crankcase beyond the valve-operating means, and which is removable to permit access to the operating means and valve devices, said member having a series of passages therein in communication with said ports and constituting a multiple manifold for the flow of gases.

5. In an internal combustion engine, a unitary casting, comprising a pair of angularly disposed cylinder blocks and a crankcase, intake and exhaust ports at the inner side of each block and a cover extending between the blocks to close the crankcase and having intake and exhaust passages therein leading to and from said intake and exhaust ports respectively.

6. In an internal combustion engine, a pair of divergently disposed cylinder blocks having intake openings in adjacent sides, a closure member for the space between said blocks secured to adjacent sides of the blocks and having fuel passages therein, aligned with said intake openings.

7. In an internal combustion engine, a unitary casting comprising a pair of divergently disposed cylinder blocks each having a number of ports opening at adjacent side surfaces, and a hollow member completely closing the space between the blocks and having its opposite faces in abutment with the adjacent side surfaces of the blocks, each face having openings aligned with said ports.

8. In an internal combustion engine, a unitary casting comprising a pair of divergently disposed cylinder blocks having exhaust ports opening through adjacent walls and means to close the space between said blocks including a member positioned between and extending from wall to wall and from end to end of the casting, and provided with a hollow interior space communicating with said exhaust ports to receive and conduct discharged gas therefrom.

9. In an internal combustion engine, a pair of divergently disposed water-jacketed cylinder blocks, a crankcase at the base of the blocks which opens into the space between the blocks, and a hollow member interposed between the blocks to close the crankcase and having communication with the respective water jackets.

10. An internal combustion engine, including spaced water-jacketed cylinder blocks having intake and exhaust ports and unitary means between the blocks having individual passages communicating with the water jackets of the two blocks and the intake and exhaust ports.

11. An internal combustion engine, including a pair of divergently disposed cylinder blocks having ports in adjacent sides, valve mechanism controlling said ports and having parts thereof in the space between the blocks, and a removable member positioned over the valve mechanism in said space to enclose the same and provided with conducting means communicating with said ports.

12. An internal combustion engine, including a pair of spaced cylinder blocks each having a plurality of intake and exhaust ports at adjacent sides, and a unitary member extending throughout the space between said blocks and having therein intake and exhaust passages in communication with the several intake and exhaust ports of the two blocks.

13. An internal combustion engine, including a pair of spaced water-jacketed cylinder blocks having intake and exhaust ports, and a unitary member extending throughout the space between said blocks and completely closing the same and having a plurality of passages therein communicating respectively with the water jackets, intake ports and exhaust ports of the two blocks.

14. The structure of claim 13 wherein the water passage communicates with the jackets at points adjacent the exhaust ports.

15. An internal combustion engine, including a pair of spaced water-jacketed cylinder blocks having exhaust ports in portions next adjacent each other, a unitary member secured to both blocks and positioned over the space therebetween to completely close the same, and provided with a plurality of passages therein, one of which communicates with the exhaust ports of the blocks and leads therefrom, and the other of which distributes cooling medium to the jackets of the two blocks and communicates with the jackets at points adjacent the exhaust ports.

16. For use with an internal combustion engine having a pair of divergently disposed cylinder blocks provided with intake ports in their adjacent sides, a unitary keystone shaped casting fitted against adjacent sides of the blocks and extended from end to end thereof to completely fill the space therebetween, said casting having fuel passages therein for communication with the intake ports of each block.

17. For use with an internal combustion engine having a pair of divergently disposed cylinder blocks, a unitary keystone shaped casting adapted to be fitted against adjacent faces of the two blocks and to extend from end to end thereof.

18. An internal combustion engine, including a pair of spaced cylinder blocks, a crankcase at the bases of the blocks which opens into the space between the blocks, valve mechanism for the blocks at the sides thereof adjacent each other and in the space therebetween, and a closure device extending from block to block over the open space beyond the crankcase and removable for access to the valve mechanism therein.

19. The structure of claim 18 wherein the removable member is provided with passages therein constituting intake and exhaust manifolds leading to and from each block.

20. An internal combustion engine, including a pair of water jacketed cylinder blocks having intake and exhaust ports, the adjacent side walls of the blocks having a series of openings leading respectively to the water jacket and ports, and a member extending throughout the space between the blocks with its opposite sides in continuous contacting abutment with the said side walls of the blocks, and having therein a water passageway, a fuel passageway and an exhaust gas passageway communicating respectively with the water jackets, intake ports and exhaust ports of the two blocks through said openings.

21. In an internal combustion engine, a pair of water jacketed cylinder blocks, a delivery duct common to and in communication with the respective jackets to distribute cooling water therebetween, means to force water through the distributor to the jackets, means between the jackets for the flow of water from one to the other, and an outlet leading from one of the jackets for the discharge of water from both jackets.

22. An internal combustion engine, including a pair of divergently disposed cylinder blocks, and a unitary member of substantially wedge shape in transverse section to fit within the space between said blocks with its sides in abutment with the adjacent sides of the blocks and of longitudinal dimension substantially corresponding to the length of said blocks to completely fill both longitudinally and transversely, the intervening space between said blocks.

23. The structure of claim 22 wherein said member is provided with one or more passages for the transmission of fluid to or from the blocks.

24. An internal combustion engine, including a pair of spaced cylinder blocks, valve mechanism for both blocks located within the space, and a removable cover of a width and length substantially conforming to that of the space between the blocks, positioned over and enclosing the valve mechanism and detachably secured to each block.

25. In an internal combustion engine, a pair of water-jacketed cylinder blocks arranged side by side and a water inlet distributor between the blocks leading to both water jackets.

26. In an internal combustion engine, a pair of water-jacketed cylinder blocks arranged side by side, a water distributing manifold between the blocks leading to the respective jackets, means to introduce cooling medium to said manifold for distribution between the jackets, an outlet leading from one of the jackets and a connection between the jackets, constituting an outlet from the other jacket.

In testimony whereof I affix my signature.

CALEB E. SUMMERS.